(No Model.)

J. SCHMITT & J. P. HUBER.
COFFEE ROASTER AND CLEANER.

No. 322,646. Patented July 21, 1885.

Attest:
Charles Pickles
Geo. L. Wheelock

Inventors
Jno. Schmitt
Jno. P. Huber,
By Knight Bros
Attys

United States Patent Office.

JOHN SCHMITT AND JOHN P. HUBER, OF ST. LOUIS, MISSOURI.

COFFEE ROASTER AND CLEANER.

SPECIFICATION forming part of Letters Patent No. 322,646, dated July 21, 1885.

Application filed March 18, 1885. (No model.)

*To all whom it may concern:*

Be it known that we, JOHN SCHMITT and JOHN P. HUBER, of the city of St. Louis, in the State of Missouri, have invented a certain new and useful Improvement in Coffee Roasters and Cleaners, of which the following is a full, clear, and exact description, reference being had to the accompanying drawings, forming part of this specification, and in which—

Figure 1:
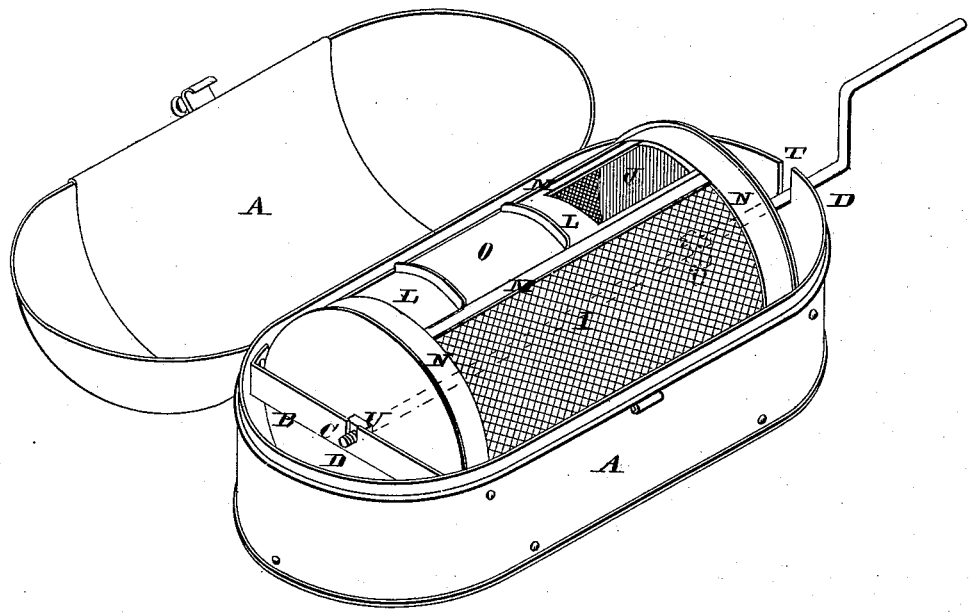
Figure 2:
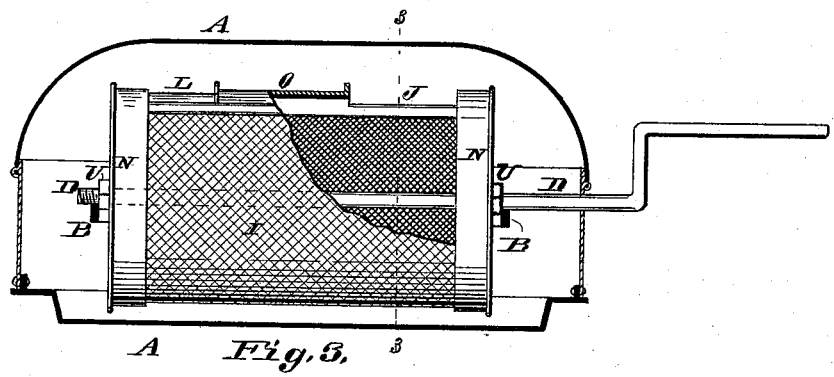
Figure 3:
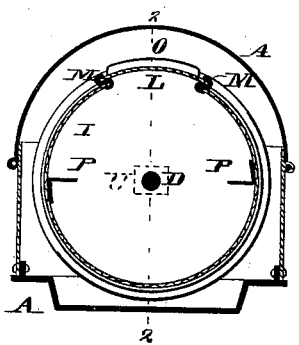

Figure 1 is a perspective view of our improved roaster and cleaner, showing the lids of the outer casing and cylinder open. Fig. 2 is a longitudinal vertical section of the case, showing the cylinder, part in side view and part broken away; and Fig. 3 is a vertical transverse section of case and cylinder.

Our invention relates to an improved apparatus for roasting and cleaning coffee; and our invention consists in features of novelty hereinafter fully described, and pointed out in the claims.

Referring to the drawings, A represents an outer case consisting of a cast-iron bottom and sheet-metal body, and top or cover that is hinged to the body.

B represents bridges or strips secured to the inside of the body, one near each end, as shown. They have notches C to receive a shaft or rod, D, that passes through and supports a cylinder, I, in which the coffee to be cleaned and roasted is placed through an opening, J, made in a strip, L, of sheet metal that extends the entire length of the cylinder and is secured to the body of the cylinder, which is made of wire-gauze, by S-shaped pieces M. (See Fig. 3.) The ends of the cylinder consist of sheet metal, and have inwardly-projecting flanges N.

O represents a sliding cover for closing the opening J. It is held in place by the strips or pieces M, as shown.

Secured to the interior of the cylinder on opposite sides are shelves or ledges P, that act to stir and turn the coffee as the cylinder is turned. The shaft extends out through an opening, T, in the case, and is bent to form a crank for turning the cylinder which is clamped between nuts U on the shaft, so as to be made to turn with it.

The apparatus is placed upon a stove or other heater, the cast-iron bottom fitting in the pot-holes, if desired, and coffee put in the cylinder, and then the covers of the case and cylinder closed and the cylinder turned by the crank to keep the coffee in motion, which will be thus both cleaned and roasted.

We are aware that it is a common expedient to join the meeting edges of two pieces of metal by means of an S-shaped binding-strip; and, further, that wire-gauze roasting-cylinders have been provided with sheet-metal heads having inturned flanges, and do not claim either, broadly, as our invention.

We claim as our invention—

1. In a nut-roasting cylinder, the combination, with the wire-gauze, the sheet-metal strip L, having the opening J, inserted between its meeting edges, and the sliding door O, of the S-shaped strips M, which secure the parts of the cylinder together and form guides for the sliding door, substantially as described.

2. In a nut-roasting cylinder, the combination, with the wire-gauze, the sheet-metal strip L, having the opening J, inserted between the edges of said gauze, and the door O, of the S-shaped strips M, for the purpose set forth, the sheet-metal heads having the inturned flanges N, the axle D, and the nuts U, all arranged substantially as set forth.

JOHN SCHMITT.
JOHN P. HUBER.

In presence of—
GEO. H. KNIGHT,
BENJN. A. KNIGHT.